(12) United States Patent
Krishtul (10) Patent No.: US 8,967,920 B2
(45) Date of Patent: Mar. 3, 2015

(54) CUTTING INSERT AND CHIP-CONTROL ARRANGEMENT THEREFOR

(75) Inventor: Roman Krishtul, Kiryat Yam (IL)

(73) Assignee: Iscar, Ltd., Tefen (IL)

( * ) Notice: Subject to any disclaimer, the term of this patent is extended or adjusted under 35 U.S.C. 154(b) by 127 days.

(21) Appl. No.: 13/452,531

(22) Filed: Apr. 20, 2012

(65) Prior Publication Data

US 2013/0064613 A1 Mar. 14, 2013

Related U.S. Application Data

(60) Provisional application No. 61/534,068, filed on Sep. 13, 2011.

(51) Int. Cl.
*B23B 27/22* (2006.01)
*B23B 27/14* (2006.01)

(52) U.S. Cl.
CPC ........ *B23B 27/143* (2013.01); *B23B 2200/0447* (2013.01); *B23B 2200/081* (2013.01); *B23B 2200/082* (2013.01); *B23B 2200/321* (2013.01); *B23B 2260/104* (2013.01)
USPC ............................ 407/113; 407/114; 407/115

(58) Field of Classification Search
CPC ...................................................... B23B 27/22
USPC ................................................ 407/113–116
See application file for complete search history.

(56) References Cited

U.S. PATENT DOCUMENTS

| | | | |
|---|---|---|---|
| 3,751,782 A * | 8/1973 | Fruish | 407/114 |
| 4,214,845 A | 7/1980 | Mori | |
| 4,273,480 A * | 6/1981 | Shirai et al. | 407/114 |
| 4,629,371 A | 12/1986 | Maeda et al. | |
| 4,720,217 A | 1/1988 | Bonjour et al. | |
| 4,915,548 A | 4/1990 | Fouquer et al. | |
| D308,387 S * | 6/1990 | Valerius | D15/130 |
| 4,941,780 A * | 7/1990 | Takahashi | 407/114 |
| 5,032,049 A | 7/1991 | Hessman et al. | |
| 5,116,167 A | 5/1992 | Niebauer | |
| 5,122,017 A * | 6/1992 | Niebauer | 407/114 |
| 5,141,367 A * | 8/1992 | Beeghly et al. | 407/119 |
| 5,193,947 A * | 3/1993 | Bernadic et al. | 407/114 |
| 5,222,843 A * | 6/1993 | Katbi et al. | 407/114 |
| 5,230,591 A * | 7/1993 | Katbi et al. | 407/114 |
| 5,282,703 A | 2/1994 | Itaba et al. | |

(Continued)

FOREIGN PATENT DOCUMENTS

| | | |
|---|---|---|
| BE | 831340 A1 | 11/1975 |
| DE | 3333100 A * | 9/1984 |

(Continued)

OTHER PUBLICATIONS

International Search Report dated Dec. 10, 2012 issued in PCT counterpart application (No. PCT/IL2012/050337).

*Primary Examiner* — Sunil K Singh
*Assistant Examiner* — Sara Addisu
(74) *Attorney, Agent, or Firm* — Womble Carlyle (57) ABSTRACT

A cutting insert has at least first and second side surfaces, with a chip-control arrangement. The chip-control arrangement includes at least one projection disposed at an intersection of a corner of the cutting insert. When the chip-control arrangement includes two projections they can be disposed symmetrically on both sides of the intersection. Each of the at least one projections is elongated and extends longitudinally along an associated side surface.

34 Claims, 4 Drawing Sheets

(56) References Cited

U.S. PATENT DOCUMENTS

| | | | |
|---|---|---|---|
| 5,476,346 A * | 12/1995 | Lundstrom | 407/114 |
| 5,477,754 A * | 12/1995 | Herbon | 76/101.1 |
| 5,577,867 A | 11/1996 | Paya | |
| 5,660,507 A * | 8/1997 | Paya | 407/114 |
| 5,695,303 A * | 12/1997 | Boianjiu et al. | 407/114 |
| 5,743,681 A * | 4/1998 | Wiman et al. | 407/114 |
| 5,758,994 A | 6/1998 | Hintze et al. | |
| 5,765,972 A * | 6/1998 | Ericksson et al. | 407/114 |
| 5,947,651 A * | 9/1999 | Murakami et al. | 407/114 |
| 6,065,907 A | 5/2000 | Ghosh et al. | |
| D430,583 S * | 9/2000 | Fang et al. | D15/139 |
| 6,193,446 B1 * | 2/2001 | Astrom et al. | 407/114 |
| 6,267,541 B1 * | 7/2001 | Isakov et al. | 407/114 |
| 6,530,726 B2 * | 3/2003 | Nelson | 407/114 |
| 6,543,970 B1 * | 4/2003 | Qvarth et al. | 407/114 |
| 6,929,428 B1 * | 8/2005 | Wermeister et al. | 407/113 |
| 6,957,935 B2 | 10/2005 | Sung et al. | |
| 7,455,483 B2 * | 11/2008 | Koskinen | 407/113 |
| 7,494,302 B2 * | 2/2009 | Ishida | 407/113 |
| 7,524,148 B2 * | 4/2009 | Okita et al. | 407/114 |
| 7,621,700 B2 * | 11/2009 | Jonsson et al. | 407/114 |
| 7,802,946 B2 * | 9/2010 | Ishida | 407/113 |
| 7,934,891 B2 * | 5/2011 | Jonsson et al. | 407/114 |
| 7,976,251 B2 * | 7/2011 | Iyori et al. | 407/114 |
| 8,142,113 B2 * | 3/2012 | Ishida | 407/113 |
| 8,251,618 B2 * | 8/2012 | Kobayashi | 407/115 |
| 8,267,623 B2 * | 9/2012 | Park et al. | 407/113 |
| 8,459,907 B2 * | 6/2013 | Mergenthaler | 408/231 |
| 8,777,525 B2 * | 7/2014 | Lof | 407/114 |
| 2008/0260476 A1 * | 10/2008 | Ishida | 407/113 |
| 2011/0070038 A1 | 3/2011 | Ishida | |
| 2011/0070039 A1 * | 3/2011 | Park et al. | 407/113 |
| 2012/0087751 A1 * | 4/2012 | Yamaguchi | 407/115 |

FOREIGN PATENT DOCUMENTS

| | | |
|---|---|---|
| JP | 2007-260848 | 10/2007 |
| JP | 2008-73827 | 4/2008 |

* cited by examiner

CUTTING INSERT AND CHIP-CONTROL ARRANGEMENT THEREFOR

RELATED APPLICATIONS

This application claims priority U.S. Provisional Patent Application No. 61/534,068, filed 13 Sep. 2011, the contents of which are incorporated by reference in their entirety.

FIELD OF THE INVENTION

The subject matter of the present application relates to a chip-control arrangement for a cutting insert. Such arrangement can be formed on an insert configured for, inter alia, turning operations.

BACKGROUND OF THE INVENTION

Cutting inserts can be provided with a chip-control arrangement for controlling the flow of and/or controlling the shape and size of the swarf and debris resulting from metalworking operations.

Such chip-control arrangements usually consist of recesses and/or projections located near a cutting edge of the insert. Upon encountering the recesses and/or projections, metal chips can be created with specific shapes and can then be evacuated therefrom.

Various chip-control arrangements are disclosed in U.S. Pat. Nos 5,758,994, 4,720,217, 5,282,703, 5,476,346, 7,976, 251 JP 2007260848, JP 2008073827, U.S. Pat. Nos. 5,577, 867 and 5,758,994.

It is an object of the present application to provide a new chip-control arrangement for a cutting insert.

SUMMARY OF THE INVENTION

In accordance with the subject matter of the present application there is provided a cutting insert comprising a corner formed with a chip-control arrangement which comprises at least one projection which is elongated.

For example, such a cutting insert can comprise:
opposing top and bottom ends and at least first and second side surfaces extending therebetween,
a first insert corner comprising a corner cutting edge formed at an intersection of the first and second side surfaces and the top end, and
a chip-control arrangement at the first insert corner;
the chip-control arrangement comprising
a first projection which is elongated and disposed on the top end adjacent to the intersection, and which extends longitudinally along the first side surface.

The cutting insert can have at the top end: a land extending along the intersection, a chip evacuation surface, and a chip deflecting surface extending between the land and chip evacuation surface; and wherein at least a majority of the first projection is located at the chip deflecting surface.

The top and bottom ends can be mirror-symmetrical.

The corner cutting edge can have a radius of curvature R and subtend a corner angle $\theta$, wherein $80° \leq \theta \leq 100°$.

The land can have a land width which can be variable. The land width can fulfill the condition $0.25 \text{ mm} \leq W_L \leq 0.36 \text{ mm}$. The land can have a land maximum width which can be located between the first projection and the first side surface. The land can decrease in height with increasing distance from an associated side surface at a predetermined land angle $\alpha$, wherein $8° \leq \alpha \leq 12°$.

The first projection can comprise first and second extremities and a middle portion therebetween. Each of the first and second extremities can be respectively closer to a respective associated side surface than the middle portion. The first and second extremities can be generally perpendicular to the middle portion and extend toward the associated side surface therefrom. The first projection can be spaced-apart from the land. The first projection can each have a length $L_P$, wherein $0.82 \text{ mm} < L_P < 1.42 \text{ mm}$. The first projection can each have a projection width $W_P$, wherein $0.09 \text{ mm} < W_P < 0.49 \text{ mm}$. The projection length can be greater than the projection width. The first projection can comprise a projection peak, and in relation to an upward direction, a lowest point of the land can be located higher than the projection peak. Each projection peak can be spaced-apart from a cutting edge plane by a projection peak distance $D_P$, wherein $0.95 \text{ mm} \leq D_P \leq 1.05 \text{ mm}$.

The chip-control arrangement can comprise a second projection. The second projection can be elongated and be disposed on the top end adjacent to the intersection and can extend longitudinally along the second side surface. The second projection can have any of the features defined above or below with respect to the first projection. Stated differently, the first and second projections can be identical.

The first and second projections can be disposed symmetrically about the intersection.

The cutting insert can comprise a plurality of corners, each of which can comprise a chip-control arrangement identical to the above-described chip-control arrangement.

The cutting insert can further comprise a central island which can comprise an elongated nose portion directed towards the intersection. Each said chip-control arrangement can be associated with a single nose portion of a central island.

The chip-control arrangement has been found to be advantageous for turning cuttings inserts, in particular for working stainless steel. However such chip-control arrangements could possibly be advantageous for other types of operations, such as, for example, milling.

It is understood that the above-said is a summary, and a cutting insert in accordance with the subject matter of the present application may comprise any of the features described hereinabove and below.

BRIEF DESCRIPTION OF THE FIGURES

For a better understanding of the present application and to show how the same may be carried out in practice, reference will now be made to the accompanying drawings, in which.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
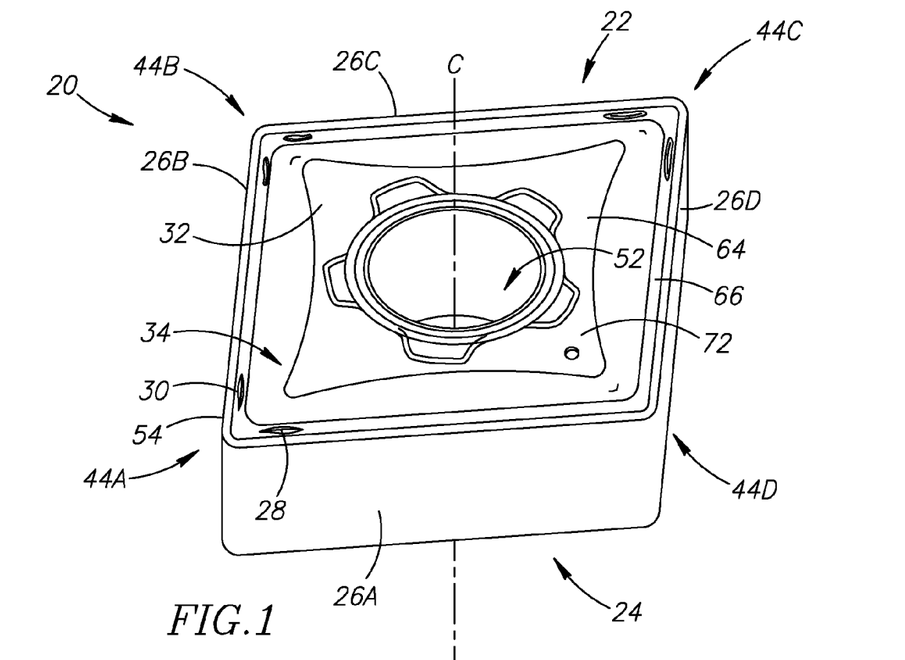
FIG. 1 is a perspective view of a cutting insert.
Figure 2:
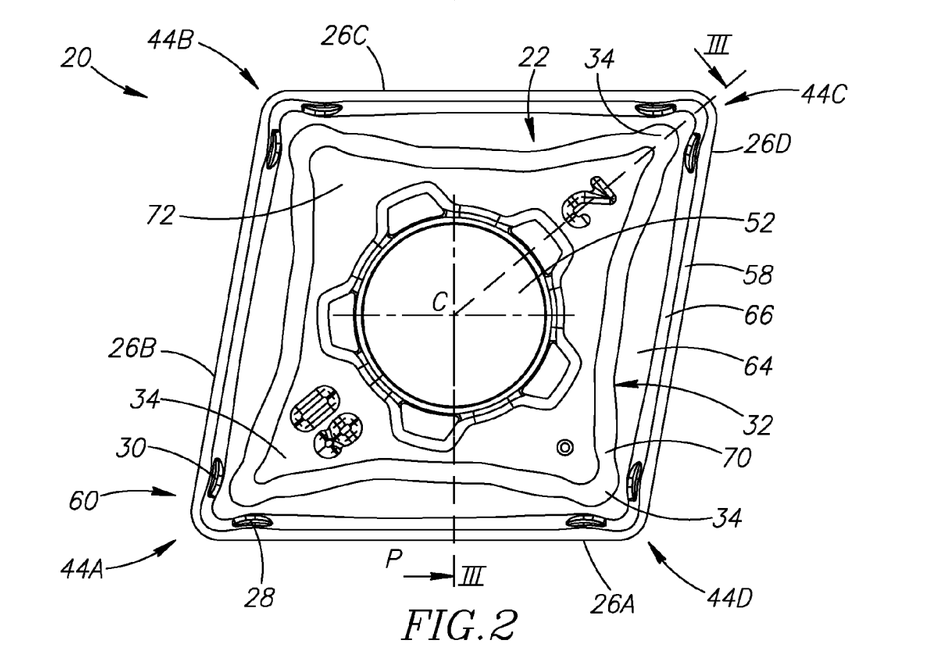
FIG. 2 is a plan view of the cutting insert in FIG. 1.
Figure 3:
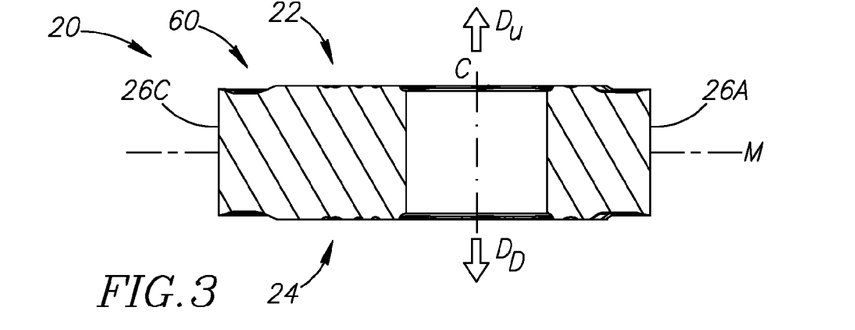
FIG. 3 is a cross section view taken along line III-II in FIG. 2.

Attention is first drawn to FIGS. 1 to 3, showing a cutting insert 20 with a chip-control arrangement 60.

The cutting insert 20 comprises opposing top and bottom ends 22, 24 and at least first and second side surfaces 26A, 26B extending therebetween.

The chip-control arrangement 60 comprises at least a first projection 28, 128, which is elongated and can be associated with a central island 32, or at least an elongated nose portion 34 thereof. The chip-control arrangement 60 can further comprise a second projection 30, 130, which is elongated and disposed on the top end 22 adjacent to the intersection 56. The second projection 30, 130 can extend longitudinally along the second side surface 26B. The second projection 30, 130 can have any of the features defined below with respect to the first projection 28, 128. With two projections 28, 128, 30, 130 the cutting insert 20 is left and right handed. As seen in the figures, the first projection 28, 128 and the second projection 30, 130 are on opposite sides of a corner bisector B and are spaced apart therefrom.

In this non-limiting example, as shown in the plan view of the top end 22 in FIG. 2, the cutting insert 20 has first, second, third and fourth side surfaces 26A, 26B, 26C, 26D, which are connected at first, second, third and fourth corners 44A, 44B, 44C, 44D. More precisely, in such view, the side surfaces 26A, 26B, 26C, 26D form a parallelogram shape and, even more precisely, a rhomboid. It is understood, however, that the chip-control arrangement 60 described hereinafter could also be formed on inserts comprising a different number of sides or, in such view, other shapes comprising at least one corner.

It is also noticed, that, in this non-limiting example, the cutting insert 22 is formed with a clamping hole 52 located in the middle thereof (in a plan view of the top end 22) which opens out to the top and bottom ends 22, 24 and is configured for receiving a clamping member (not shown) therethrough. It is understood that alternative methods of fastening an insert to an insert holder could be employed, for example clamping jaws, and therefore such inserts could be devoid of a clamping hole 52.

A central axis C extends through the top and bottom ends 22, 24. In this non-limiting example, the central axis C is coaxial with the clamping hole 52, and each of the first, second, third and fourth side surfaces 26A, 26B, 26C, 26D extend between the top and bottom ends 22, 24 in a direction parallel to the central axis C. References made hereinafter to height are measurable along the central axis C. Additionally, as shown in FIG. 3, the central axis C defines upward and downward directions $D_U$, $D_D$.

A corner cutting edge 54 is formed at an intersection 56 of the first and second side surfaces 26A, 26B and the top end 22. In this non-limiting example, the corner cutting edge 54 may belong to a peripheral cutting edge which extends peripherally along the entire top end 22, i.e., away from the intersection of the first and second side surfaces 26A, 26B and also along the third and fourth side surfaces 26C, 26D. However, it is understood that it would have been sufficient for the corner cutting edge 54 to extend only at one or more cutting insert corners. Whilst, in this non-limiting example, the cutting insert 20 is double-sided with each of the eight corners thereof being formed with an identical chip-control arrangement 60 and the top and bottom ends 22, 24 being mirror symmetrical about a plane of mirror symmetry M that is perpendicular to the central axis C and extends through the first and second side surfaces 26A, 26B, it is sufficient for the description hereinafter to only refer to the corner cutting edge 54 at the first corner 44A. It is also understood that a cutting insert in accordance with the subject matter of the present application could comprise one or more corners with such a chip-control arrangement 60 and one or more other corners which are devoid of any chip-control arrangement or which are formed with a different chip-control arrangement. To elaborate, for example, the chip-control arrangement 60 could be deployed on any number of corners of a cutting insert 20 (for example, only at opposite diagonal corners 44A, 44C), and/or at two ends thereof (for example, at one or more corners on both the top end 22 and the bottom end 24) in a case where an insert is double-ended.

Figure 4:
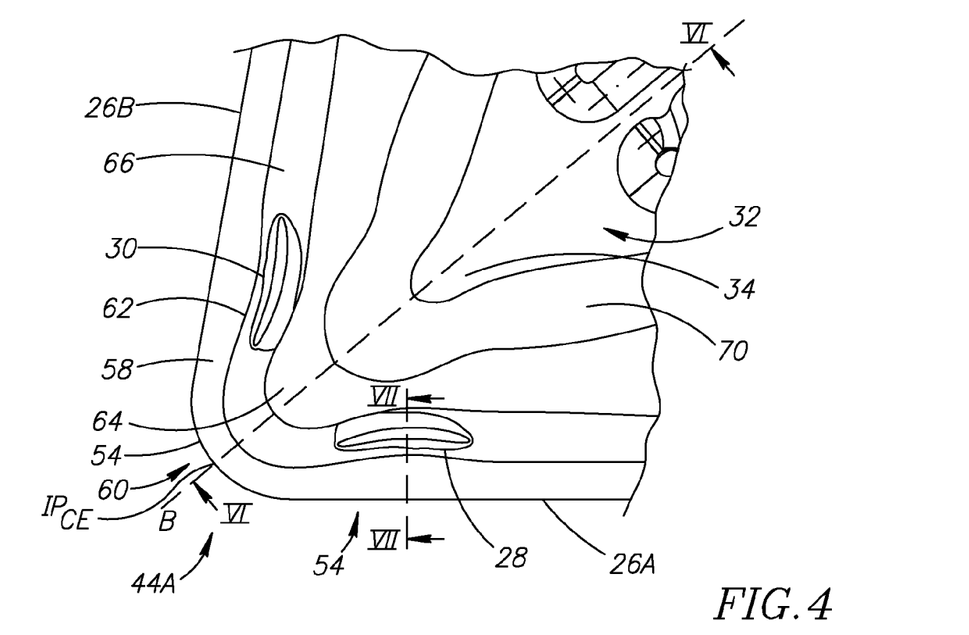
FIG. 4 is an enlarged view of a corner of the cutting insert in FIGS. 1 and 2.
Figure 5:
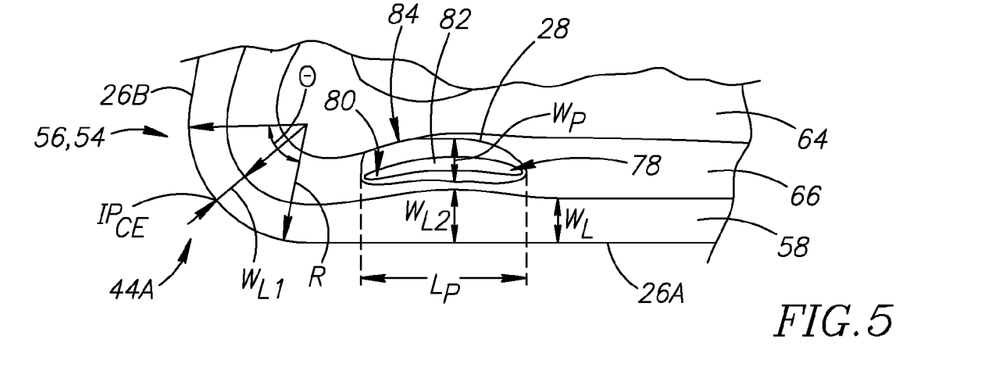
FIG. 5 is an enlarged view of a part of the corner in FIG. 4.

Referring now to the plan view of the top end 22 in FIGS. 4 and 5, the corner cutting edge 54 at the first corner 44A of the cutting insert 20 can be curved at a predetermined radius of curvature R. In this non-limiting example, the corner cutting edge 54 subtends a corner angle θ of 80°. That is to say, the corner cutting edge 54 follows an 80° arc having radius of curvature R. In another non-limiting example, the corner cutting edge 54 subtends a corner angle θ of 100°. It is understood that the corner cutting edge 54 having a radius of curvature R subtends a corner angle θ which fulfills the condition 80°≤θ≤100°.

Figure 6:
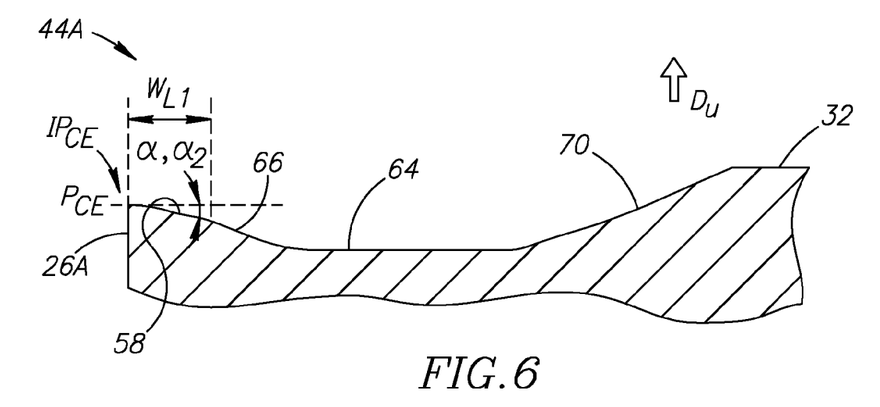
FIG. 6 is a cross section view taken along line VI-VI in FIG. 4.
Figure 7:
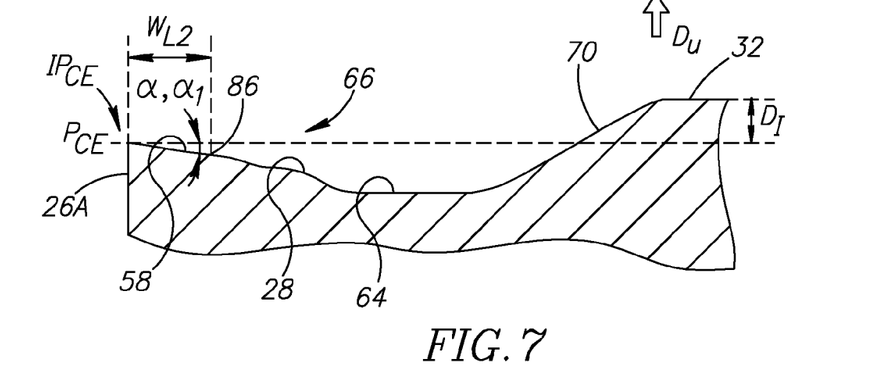
FIG. 7 is a cross section view taken along line VII-VII in FIG. 4.
Figure 8:
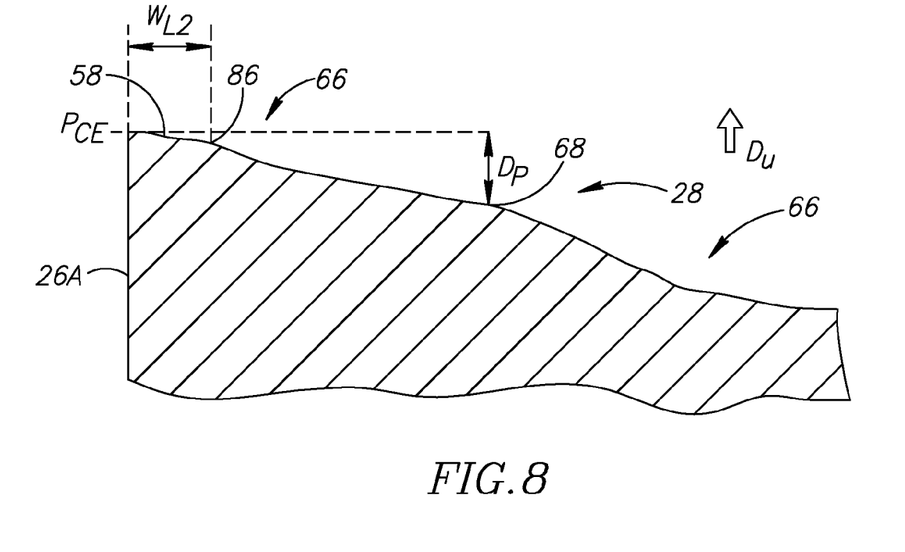
FIG. 8 is an enlarged view of a part of the cross section view in FIG. 7.

A land 58 can extend along the intersection 56. The land 58 can strengthen the corner cutting edge 54. The land 58 can further comprise, in a plan view of the top end 22, a convexly-shaped inner edge 62. The land 58 can have a land width $W_L$, which, in a plan view of the top end 22, extends from an associated side surface 26A and in a direction perpendicular thereto. The land width $W_L$ can be variable. For example, the land 58 can have a land minimum width $W_{L1}$ and a land maximum width $W_{L2}$. The land minimum width $W_{L1}$ can be located at a corner 44A of the cutting insert 20. The land minimum width $W_{L1}$ can have a value of 0.25 mm. The land maximum width $W_{L2}$ can be located between the first projection 28 and an associated side surface 26A. More precisely, the land maximum width $W_{L2}$ can be located between a middle portion 82 of the first projection 28 and the associated side surface 26A. The land maximum width $W_{L2}$ can have a value of 0.36 mm. It is understood that while a preferred range for the land width $W_L$ fulfills the condition 0.25 mm≤$W_L$≤0.36 mm, values outside of this range are also feasible. Referring now to FIGS. 6 and 7, the land 58 follows a straight line when viewed along a cross section thereof which is perpendicular to an associated side surface 26A. The land 58 can be slanted. In this non-limiting example, the land 58 decreases in height with increasing distance from an associated side surface 26A at a predetermined land angle α formed between the land 58 and a cutting edge plane $P_{CE}$ perpendicular to the central axis C and intersecting an intersection point $IP_{CE}$ of the first and second side surfaces 26A, 26B and the top end 22.

The land angle α can be variable at different points along the length of the land 58. For example, the land angle α can have a land minimum angle $α_1$ and a land maximum angle $α_2$.

The land minimum angle $\alpha_1$ can be located at a point along the land 58 adjacent to one of the first and second projections 28, 30. The land minimum angle $\alpha_1$ can have a value greater or equal to 8°. The land minimum angle $\alpha_1$ can have a value less than or equal to 10°. It is understood that a range for the land minimum angle $\alpha_1$ fulfills the condition $8° \le \alpha_1 \le 10°$.

The land maximum angle $\alpha_2$ can be located at a point along the land 58 spaced-apart from the first and second projections 28, 30. The land maximum angle $\alpha_2$ can have a value greater or equal to 10°. The land maximum angle $\alpha_2$ can have a value less than or equal to 12°. In this non-limiting example, the land minimum angle $\alpha_1$ has a value of 9° and the land maximum angle $\alpha_2$ has a value of 11°. It is understood that a range for the land maximum angle $\alpha_2$ fulfills the condition $9° \le \alpha_2 \le 11°$.

Reverting to FIG. 2, a chip evacuation surface 64 can be located at the top end 22 and is spaced-apart from the land 58. The chip evacuation surface 64 is configured to evacuate chips (not shown) away from the corner cutting edge 54. In this non-limiting example, the chip evacuation surface 64 can be planar and can extend perpendicularly to the central axis C, though in other examples the chip evacuation surface 64 can be non-planar.

A chip deflecting surface 66 can extend between the land 58 and chip evacuation surface 64. The chip deflecting surface 66 is configured to deflect and direct metal debris (not shown) created through a metal working operation, towards the chip evacuation surface 64.

The central island 32 can extend from the chip evacuation surface 64 in a direction towards the central axis C. The central island 32 can be surrounded by the chip evacuation surface 64. More precisely, in this non-limiting example, the central island 32 extends between the chip evacuation surface 64 and the clamping hole 52, and can surround the latter. The central island 32 can extend higher than the chip evacuation surface 64.

The elongated nose portion 34 of the central island 32 can be directed towards an associated intersection 56. The central island 32 can comprise a plurality of elongated nose portions 34, each of which is associated with and directed towards an associated intersection 56. In a plan view of the top end 22, each elongated nose portion 34 can be connected by a convexly curved island connecting portion 70. The central island 32 can comprise an innermost portion 72, which, in this non-limiting example, is located between the nose portions 34 and the clamping hole 52. The innermost portion 72 can be planar. The innermost portion 72 can be a height $D_I$ (FIG. 7) above the cutting edge plane $P_{CE}$. In this non-limiting example, the height $D_I$ can be 0.14 mm.

Referring now to FIGS. 4 to 8, the first and second projections 28, 128, 30, 130 are configured to cause metal debris to form chips with desired shapes and sizes and to facilitate their evacuation from the cutting area. More precisely, at least a majority of the first and second projections 28, 30 can extend from the chip deflecting surface 66 and protrude therefrom. A minority of the first and second projections 28, 30 can be located partly on the chip evacuation surface 64. The first and second projections 28, 128, 30, 130 can be disposed symmetrically about the corner bisector B at the intersection 56 or the associated corner 44A. Since the first and second projections 28, 128, 30, 130 are identical, the following description will relate to only the first projection 28, 128, for the sake of conciseness, with the understanding that the same is true for the second projection 30, 130.

Figure 9:
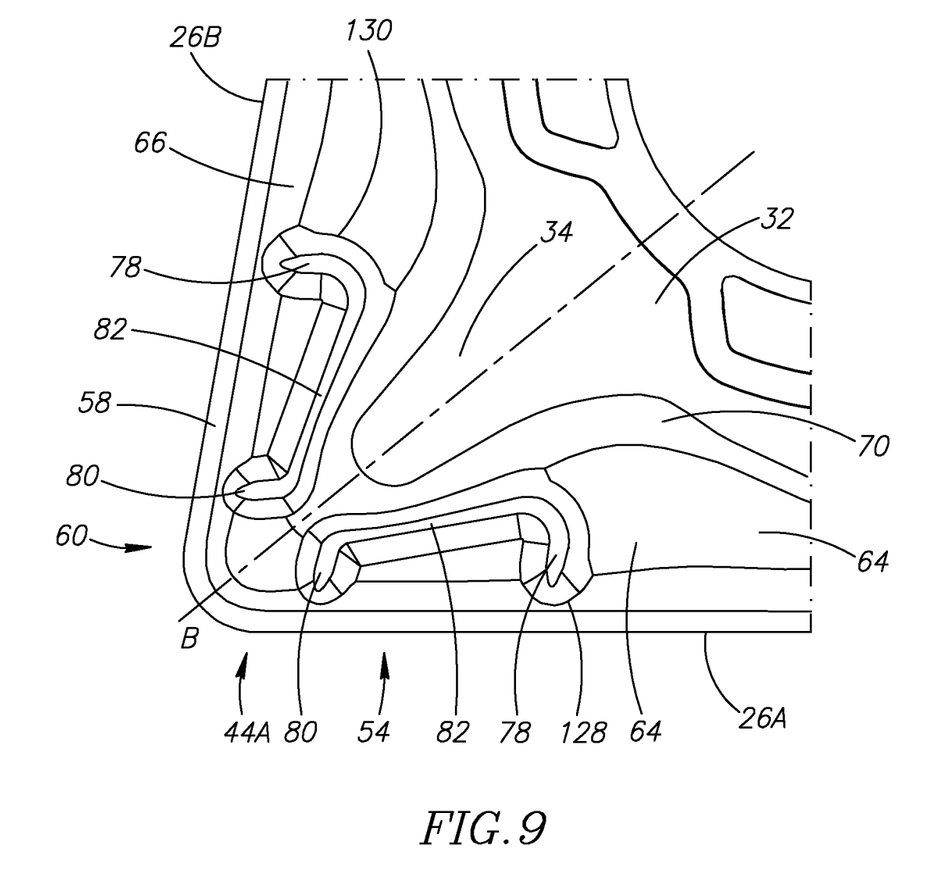
FIG. 9 shows an embodiment in which the extremities of the projection extend generally perpendicular to its middle portion.

The first projection 28, 128 extends longitudinally along an associated side surface 26A. The first projection 28, 128 can extend between adjacent corners 44A, 44D. In this non-limiting example, in a plan view of the top end 22, the first projection 28, 128 can have a concave-curved shape. More precisely, in such view, first and second extremities 78, 80 of the first projection 28, 128 can be closer than the middle portion 82 thereof to an associated side surface 26A. Referring now to FIG. 9, the first and second extremities 78, 80 can be generally perpendicular to the middle portion 82 and extend in a direction of the first side surface 26A therefrom. It will be understood that even though the first projection 28, 128 may be curved, with the middle portion 82 being only slightly curved, it can still be considered to extend or be elongated in a direction principally defined by the middle portion 82. Thus, for example, the first projection 28, 128 can be considered to extend from its middle portion 82, in opposite directions, towards adjacent corners 44A, 44D. It is further noticed that the extremities 78, 80 of each elongated portion define a projection length $L_P$ of the first projection 28 along the associated side surface 26A between adjacent corners 44A, 44D. The projection length $L_P$ can correspond to and coincide with, a length of a curved portion of the chip deflection surface 66 at which the associated projection is located. Similarly, the extremities 78, 80 of each elongated portion can correspond to boundaries of the land's convexly-shaped inner edge 62. Stated differently, a length of the land's convexly-shaped inner edge 62 can have an identical magnitude to a magnitude of the projection length $L_P$.

The first projection 28 can be disposed closer to an associated corner 44A than to a midway point P of an associated side surface 26A. More precisely, the first projection 28 can be located within the closest third of an imaginary division of the top end 22 extending from the second side surface 26B at the first corner 44A and extending to the midway point P of the side surface 26A. Even more precisely, if such imaginary division would comprise of six equal parts, the first projection 28 would be located at the second part from the corner 44A.

Referring to FIG. 5, the first projection 28 can be connected to the chip evacuation surface 64 at a connection area designated as 84. The first projection 28 can be spaced-apart from the land 58. The first projection 28 has a projection width $W_P$ taken in a direction perpendicular to the projection length $L_P$, where the projection length $L_P$ is greater than the projection width $W_P$, i.e., $L_P > W_P$. The projection length $L_P$ of the first projection 28 can have a magnitude at least three times a maximum magnitude of the projection width $W_P$, i.e., $L_P > 3W_P$. For example, the projection length $L_P$ can have a value of 1.12 mm and the maximum projection width $W_P$ can have a value of 0.29 mm. In other examples, the projection length $L_P$ can have values between 0.82 mm and 1.42 mm and the maximum projection width $W_P$ can have values between 0.09 mm and 0.49 mm.

Referring now to FIG. 7, and in relation to upward direction $D_U$, even a lowest point 86 of the land 58 (i.e. a point 86 furthest from the side surface 26A) is located higher than a projection peak 68 of the first projection 28. Furthermore, the projection peak 68 of the first projection 28 is distanced from the cutting edge plane $P_{CE}$ by a projection peak distance $D_P$. The projection peak distance $D_P$ can be greater or equal to 0.95 mm. The projection peak distance $D_P$ can be less than or equal to 1.05 mm. In this non-limiting example, the projection peak distance $D_P$ has a value of 0.1 mm. It is understood that a range for the projection peak distance $D_P$ fulfills the condition $0.95 \text{ mm} \le D_P \le 1.05 \text{ mm}$.

It is understood that the chip-control arrangement in accordance with the subject matter of the present application can be free of additional elements for achieving desired chip-control. Stated differently, a chip-control arrangement in accordance with the subject matter of the present application can comprise exactly/only two projections. In other words, the chip-control arrangement can be devoid of any additional projections. Additionally, the chip-control arrangement or a corner of a cutting insert having same; can be associated with a single nose portion of a central island.

Although the subject matter of the present application has been described to a certain degree of particularity, it should be understood that various alterations and modifications could be made without departing from the spirit or scope of the subject matter of the application as hereinafter claimed. For example, while example ranges, values and element-locations described above were found to be an advantageous configuration for turning inserts, particularly for working stainless steel, other ranges, values and element-locations for different types of operations and/or workpiece materials are also feasible.

What is claimed is:

1. A cutting insert (20), comprising
opposing top and bottom ends (22, 24) and at least first and second side surfaces (26A, 26B) extending therebetween,
a first insert corner (44A) comprising a corner cutting edge (54) formed at an intersection (56) of the first and second side surfaces (26A, 26B) and the top end (22),
a land extending along the intersection at the top end,
a chip evacuation surface extending at the top end,
a chip deflecting surface (66) extending between the land (58) and chip evacuation surface (64), and
a chip-control arrangement (60) at the first insert corner (44A);
the chip-control arrangement (60) comprising:
a first projection (28, 128) which is elongated and disposed on the top end (22) adjacent to the intersection (56) and which extends longitudinally along the first side surface (26A) in a direction from the first insert corner (44A) toward an adjacent insert corner (44D);
wherein at least a majority of the first projection (28) is located at the chip deflecting surface (66).

2. The cutting insert (20) according to claim 1, wherein the land (58) has a land width ($W_L$) which is variable.

3. The cutting insert (20) according to claim 2, wherein the land width ($W_L$) fulfills the condition 0.25 mm $\leq W_L \leq$ 0.36 mm.

4. The cutting insert (20) according to claim 1, wherein the land has a land maximum width ($W_{L2}$) which is located between the first projection (28) and the first side surface (26A).

5. The cutting insert (20) according to claim 1, wherein the first projection (28) is spaced-apart from the land (58).

6. The cutting insert (20) according to claim 1, wherein the first projection (28) is partly located on the chip evacuating surface (64).

7. The cutting insert (20) according to claim 1, wherein the land (58) decreases in height with increasing distance from the first side surface (26A) at a predetermined land angle α, wherein 8°≤α≤12°.

8. The cutting insert (20) according to claim 1, comprising a plurality of corners (44A, 44B, 44C, 44D), each of which comprises a chip-control arrangement (60) identical to said chip-control arrangement (60).

9. The cutting insert (20) according to claim 1, wherein the top and bottom ends (22, 24) are mirror-symmetrical.

10. The cutting insert (20) according to claim 1, wherein the corner cutting edge (54) has a radius of curvature (R) and subtends a corner angle θ, wherein 80°≤θ≤100°.

11. The cutting insert (20) according to claim 1, further comprising a central island (32) which comprises an elongated nose portion (34) directed towards the intersection (56).

12. The cutting insert (20) according to claim 1, wherein the first projection (28) has a length $L_p$, wherein 0.82 mm <$L_p$<1.42 mm.

13. The cutting insert (20) according to claim 1, wherein the first projection (28) has a width $W_p$, wherein 0.09 mm <$W_p$<0.49 mm.

14. The cutting insert (20) according to claim 1, wherein the chip-control arrangement (60) comprises exactly and only two projections (28, 30).

15. The cutting insert (20) according to claim 1, wherein the chip-control arrangement (60) is associated with a single nose portion (34) of a central island (32).

16. The cutting insert (20) according to claim 1, wherein:
an imaginary division of the top end (22) extends from the second side surface (26B) at the first corner (44A) to the midway point (P) of the side surface (26A) and comprises six equal parts; and
the first projection (28) is entirely located within the part second closest to the first insert corner (44A).

17. The cutting insert (20) according to claim 1, wherein the first projection (28) has a projection length $L_p$ and a projection width $W_p$ perpendicular to the projection length $L_p$ and $L_p$>3 $W_p$.

18. A cutting insert (20), comprising
opposing top and bottom ends (22, 24) and at least first and second side surfaces (26A, 26B) extending therebetween,
a first insert corner (44A) comprising a corner cutting edge (54) formed at an intersection (56) of the first and second side surfaces (26A, 26B) and the top end (22), and
a chip-control arrangement (60) at the first insert corner (44A);
the chip-control arrangement (60) comprising
a first projection (28, 128) which is elongated and disposed on the top end (22) adjacent to the intersection (56) and which extends longitudinally along the first side surface (26A) in a direction from the first insert corner (44A) toward an adjacent insert corner (44D);
wherein the first projection (28, 128) comprises a peak (68) having first and second extremities (78, 80) and a middle portion (82) therebetween; and
each of the first and second extremities (78, 80) is respectively closer to the first side surface (26A) than the middle portion (82).

19. A cutting insert (20), comprising
opposing top and bottom ends (22, 24) and at least first and second side surfaces (26A, 26B) extending therebetween,
a first insert corner (44A) comprising a corner cutting edge (54) formed at an intersection (56) of the first and second side surfaces (26A, 26B) and the top end (22), and
a chip-control arrangement (60) at the first insert corner (44A);
the chip-control arrangement (60) comprising
a first projection (28, 128) which is elongated and disposed on the top end (22) adjacent to the intersection (56) and which extends longitudinally along the first side surface (26A);
the top end further comprising
a land (58) extending along the intersection (56),
a chip evacuation surface (64), and
a chip deflecting surface (66) extending between the land (58) and chip evacuation surface (64); and wherein at least a majority of the first projection (28) is located at the chip deflecting surface (66) and the first projection (28) comprises a projection peak (68), and in relation to an upward direction $D_u$, a lowest point (86) of the land (58) is located higher than the projection peak (68).

20. The cutting insert (20) according to claim 19, wherein the projection peak (68) is spaced-apart from a cutting edge plane ($_{PCE}$) by a projection peak distance $D_P$, wherein 0.95 mm $\leq D_p \leq$ 1.05 mm.

21. A cutting insert (20), comprising opposing top and bottom ends (22, 24) and at least first and second side surfaces (26A, 26B) extending therebetween, a first insert corner (44A) comprising a corner cutting edge (54) formed at an intersection (56) of the first and second side surfaces (26A, 26B) and the top end (22), and a chip-control arrangement (60) at the first insert corner (44A);

the chip-control arrangement (60) comprising a first projection (28, 128) which is elongated and disposed on the top end (22) adjacent to the intersection (56) and which extends longitudinally along the first side surface (26A) in a direction from the first insert corner (44A) toward an adjacent insert corner (44D);

wherein the chip-control arrangement (60) further comprises a second projection (30) which is elongated and disposed on the top end (22) adjacent to the intersection (56) and which extends longitudinally along the second side surface (26B).

22. The cutting insert (20) according to claim 21, wherein the first and second projections (28, 30) are disposed symmetrically about a corner bisector (B) at the intersection (56).

23. The cutting insert (20) according to claim 22, wherein the first and second projections (28, 30) are identical.

24. The cutting insert (20) according to claim 21, wherein the first and second projections (28, 30) are identical.

25. A cutting insert (20), comprising opposing top and bottom ends (22, 24) and at least first and second side surfaces (26A, 26B) extending therebetween, a first insert corner (44A) comprising a corner cutting edge (54) formed at an intersection (56) of the first and second side surfaces (26A, 26B) and the top end (22), and a chip-control arrangement (60) at the first insert corner (44A);

the chip-control arrangement (60) comprising a first projection (28, 128) which is elongated and disposed on the top end (22) adjacent to the intersection (56) and which extends longitudinally along the first side surface (26A), wherein the first projection (128) comprises first and second extremities (78, 80) and a middle portion (82) therebetween;

each of the first and second extremities (78, 80) is respectively closer to the first side surface (26A) than the middle portion (82); and the first and second extremities (78, 80) are generally perpendicular to the middle portion (82) and extend in a direction of the first side surface (26A) therefrom.

26. The cutting insert (20) according to claim 25, wherein the chip-control arrangement (60) comprises exactly and only two projections (128, 130).

27. A double sided cutting insert (20), comprising opposing identical top and bottom ends (22, 24) and at least first and second side surfaces (26A, 26B) extending therebetween, a first insert corner (44A) comprising a corner cutting edge (54) formed at an intersection (56) of the first and second side surfaces (26A, 26B) and the top end (22), and a chip-control arrangement (60) at the first insert corner (44A);

the chip-control arrangement (60) comprising a first projection (28, 128) which is elongated and disposed on the top end (22) adjacent to the intersection (56) and which extends longitudinally along the first side surface (26A) in a direction from the first insert corner (44A) toward an adjacent insert corner (44D); wherein:

an imaginary division of the top end (22) extends from the second side surface (26B) at the first corner (44A) to the midway point (P) of the side surface (26A) and comprises six equal parts; and the first projection (28) is entirely located within the first two parts closest to the first insert corner (44A).

28. The cutting insert (20) according to claim 27, wherein the chip-control arrangement (60) further comprises a second projection (30) which is elongated and disposed on the top end (22) adjacent to the intersection (56) and which extends longitudinally along the second side surface (26B).

29. The cutting insert (20) according to claim 28, wherein the first and second projections (28, 30) are disposed symmetrically about a corner bisector (B) at the intersection (56).

30. The cutting insert (20) according to claim 29, wherein the first and second projections (28, 30) are identical.

31. The cutting insert (20) according to claim 30, wherein the chip-control arrangement (60) at the first corner (44A) comprises exactly and only two projections (28, 30).

32. The cutting insert (20) according to claim 31, wherein the first projection (28) has a projection length $L_p$ and a projection width $W_p$ perpendicular to the projection length $L_p$ and $L_p \geq 3 W_p$.

33. A cutting insert (20), comprising opposing top and bottom ends (22, 24) and at least first and second side surfaces (26A, 26B) extending therebetween, a first insert corner (44A) comprising a corner cutting edge (54) formed at an intersection (56) of the first and second side surfaces (26A, 26B) and the top end (22), and a chip-control arrangement (60) at the first insert corner (44A);

the chip-control arrangement (60) comprising a first projection (28, 128) which is elongated and disposed on the top end (22) adjacent to the intersection (56) and which extends longitudinally along the first side surface (26A), wherein the chip-control arrangement (60) further comprises a second projection (30) which is elongated and disposed on the top end (22) adjacent to the intersection (56) and which extends longitudinally along the second side surface (26B), such that a line passing longitudinally through the first projection will intersect a line passing longitudinally though the second projection.

34. A cutting insert (20), comprising opposing top and bottom ends (22, 24) which are mirror-symmetrical and at least first and second side surfaces (26A, 26B) extending therebetween, a first insert corner (44A) comprising a corner cutting edge (54) formed at an intersection (56) of the first and second side surfaces (26A, 26B) and the top end (22), and a chip-control arrangement (60) at the first insert corner (44A);

the chip-control arrangement (60) comprising:

a first projection (28, 128) which is elongated and disposed on the top end (22) adjacent to the intersection (56) and which extends longitudinally along the first side surface (26A) in a direction from the first insert corner (44A) toward a first adjacent insert corner (44D); and a second projection (30, 130) which is elongated and disposed on the top end (22) adjacent to the intersection (56) and which extends longitudinally along the second side surface (26B) in a direction from the first insert corner (44A) toward a second adjacent insert corner (44B); wherein:

the first and second projections are closer to each other, than either projection is to any other projection.

\* \* \* \* \*